(12) United States Patent
Barrett et al.

(10) Patent No.: US 8,596,417 B2
(45) Date of Patent: Dec. 3, 2013

(54) LUBRICATION SYSTEMS WITH NOZZLE BLOCKAGE DETECTION SYSTEMS

(75) Inventors: Rich Barrett, Mesa, AZ (US); Larry Ball, Chandler, AZ (US); Douglas Spencer, Mesa, AZ (US); Victor Reyes, Chandler, AZ (US); Don Rossi, Scottsdale, AZ (US); Alan Tiltman, Fountain Hills, AZ (US); Daniel Troller, Fountain Hills, AZ (US); James Ebken, Gilbert, AZ (US); Mike O'Brien, Goodyear, AZ (US)

(73) Assignee: Honeywell International Inc., Morristown, NJ (US)

( * ) Notice: Subject to any disclaimer, the term of this patent is extended or adjusted under 35 U.S.C. 154(b) by 218 days.

(21) Appl. No.: 13/176,421

(22) Filed: Jul. 5, 2011

(65) Prior Publication Data

US 2013/0008745 A1 Jan. 10, 2013

(51) Int. Cl.
*F01M 1/18* (2006.01)
*F01M 11/10* (2006.01)
*F01D 25/18* (2006.01)

(52) U.S. Cl.
USPC .......................................... 184/6.11; 184/6.4

(58) Field of Classification Search
USPC ................................................ 184/6.4, 6.11
See application file for complete search history.

(56) References Cited

U.S. PATENT DOCUMENTS

| | | | | |
|---|---|---|---|---|
| 2,188,463 A | * | 1/1940 | Mercier | 137/115.2 |
| 2,395,941 A | * | 3/1946 | Rockwell | 137/115.15 |
| 3,045,419 A | * | 7/1962 | Addie et al. | 60/605.3 |
| 4,470,428 A | * | 9/1984 | Bishop et al. | 137/115.15 |
| 4,545,401 A | * | 10/1985 | Karpis | 137/487 |
| 4,705,217 A | * | 11/1987 | Hartley et al. | 239/142 |
| 4,758,131 A | * | 7/1988 | Gurney | 417/259 |
| 5,038,893 A | * | 8/1991 | Willner et al. | 184/7.4 |
| 5,121,599 A | * | 6/1992 | Snyder et al. | 60/779 |
| 5,311,905 A | * | 5/1994 | De Santis | 137/613 |
| 5,320,196 A | * | 6/1994 | Mouton | 184/6.4 |
| 5,427,151 A | * | 6/1995 | Pauley | 137/895 |
| 5,482,138 A | * | 1/1996 | Mori et al. | 184/6.4 |
| 5,487,447 A | * | 1/1996 | Martinez Velazquez | 184/1.5 |
| 5,701,795 A | * | 12/1997 | Friedrichsen | 91/446 |
| 5,964,318 A | * | 10/1999 | Boyle et al. | 184/1.5 |
| 6,008,724 A | * | 12/1999 | Thompson | 340/438 |
| 6,244,385 B1 | * | 6/2001 | Tsubata et al. | 184/6.4 |
| 6,578,669 B2 | * | 6/2003 | Kast et al. | 184/3.2 |
| 6,745,610 B2 | * | 6/2004 | Takeuchi | 72/370.25 |
| 6,746,610 B2 | | 6/2004 | Manz et al. | |
| 6,857,444 B2 | * | 2/2005 | Davis | 137/115.06 |
| 6,886,324 B1 | * | 5/2005 | Handshuh et al. | 60/39.08 |
| 6,991,065 B2 | * | 1/2006 | Leslie et al. | 184/2 |
| 7,000,734 B2 | * | 2/2006 | Nawamoto et al. | 184/6.26 |
| 7,017,712 B1 | * | 3/2006 | Rake et al. | 184/6.4 |

(Continued)

*Primary Examiner* — William A Rivera
*Assistant Examiner* — Henry Liu
(74) *Attorney, Agent, or Firm* — Ingrassia Fisher & Lorenz, P.C.

(57) ABSTRACT

A lubrication system is provided for delivering a lubricant to a plurality of nozzles. The lubrication system includes a reservoir for the lubricant; a pump fluidly coupled to the reservoir and configured to remove a flow of the lubricant from the reservoir; a lubrication sensor positioned between the pump and the plurality of nozzles and configured to detect a blockage in the plurality of nozzles and to generate a blockage signal when the blockage is detected; and an indicator coupled to the lubrication sensor and configured to generate a warning based on the blockage signal from the lubrication sensor.

17 Claims, 9 Drawing Sheets

(56) References Cited

U.S. PATENT DOCUMENTS

| | | | |
|---|---|---|---|
| 7,163,086 B2* | 1/2007 | Care et al. | 184/6.11 |
| 7,367,427 B2* | 5/2008 | Gaines et al. | 184/6.11 |
| 7,426,884 B2* | 9/2008 | Thiry et al. | 91/512 |
| 7,506,724 B2* | 3/2009 | Delaloye | 184/6.2 |
| 7,566,320 B2* | 7/2009 | Duchon et al. | 604/131 |
| 7,640,723 B2* | 1/2010 | Alexander | 60/39.08 |
| 8,230,974 B2* | 7/2012 | Parnin | 184/6.11 |
| 2002/0157901 A1* | 10/2002 | Kast et al. | 184/3.2 |
| 2003/0219345 A1* | 11/2003 | Sugita et al. | 417/228 |
| 2003/0230274 A1* | 12/2003 | Williams et al. | 123/196 R |
| 2004/0031647 A1* | 2/2004 | Leslie et al. | 184/3.1 |
| 2004/0079411 A1* | 4/2004 | Davis | 137/115.16 |
| 2004/0140161 A1* | 7/2004 | Clancy et al. | 184/55.1 |
| 2005/0241880 A1* | 11/2005 | Nawamoto et al. | 184/6 |
| 2006/0081419 A1* | 4/2006 | Care et al. | 184/6.11 |
| 2007/0137936 A1* | 6/2007 | Akechi et al. | 184/14 |
| 2008/0116010 A1* | 5/2008 | Portlock et al. | 184/6.12 |
| 2008/0203735 A1* | 8/2008 | Leslie | 291/3 |
| 2008/0264542 A1* | 10/2008 | Hawkins et al. | 152/510 |
| 2009/0299535 A1* | 12/2009 | Delaloye | 700/282 |
| 2010/0025158 A1* | 2/2010 | Allam | 184/6.3 |
| 2010/0147403 A1* | 6/2010 | Bresnahan | 137/528 |
| 2010/0213010 A1* | 8/2010 | Cornet et al. | 184/6.11 |
| 2012/0007009 A1* | 1/2012 | Yie | 251/321 |

\* cited by examiner

LUBRICATION SYSTEMS WITH NOZZLE BLOCKAGE DETECTION SYSTEMS

TECHNICAL FIELD

The present invention generally relates to lubrication systems for gas turbine engines, and more particularly relates to lubrication systems with nozzle blockage detection systems in gas turbine engines.

BACKGROUND

Lubrication is an important aspect of maintaining machinery in proper operating condition. Machine elements such as bearings, journals, shafts, and joints require lubrication between moving surfaces to decrease friction, prevent contamination, reduce wear and dissipate heat. In some cases, improper lubrication has the potential to result in premature component wear. Accordingly, gas turbine engines include lubrication systems to maintain a flow of a suitable lubricant through the engine, including in the turbines or gearboxes. In most lubrication systems, a supply pump feeds the lubricant from a reservoir through a supply conduit to a nozzle device that sprays the lubricant onto the elements to be lubricated, and a return pump directs lubricant collected in a sump back into the reservoir to repeat the flow circuit.

Over time and particularly at high temperature operation, some of the lubricant may undergo a coking process in which solids are formed and deposited in the lubrication system. At times, coking may result in blockages in the nozzles, which if unaddressed, may impede lubricant from properly flowing through the system. Typically, this issue is evaluated according to a maintenance schedule when the engine is offline. Generally, conventional systems do not have a mechanism for detecting nozzle blockage during operation.

Accordingly, it is desirable to provide a lubrication system with a nozzle blockage detection system that indicates potential blockage issues within the lubrication system, particularly during operation of the associated engine. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a lubrication system is provided for delivering a lubricant to a plurality of nozzles. The lubrication system includes a reservoir for the lubricant; a pump fluidly coupled to the reservoir and configured to remove a flow of the lubricant from the reservoir; a lubrication sensor positioned between the pump and the plurality of nozzles and configured to detect a blockage in the plurality of nozzles and to generate a blockage signal when the blockage is detected; and an indicator coupled to the lubrication sensor and configured to generate a warning based on the blockage signal from the lubrication sensor.

In accordance with another exemplary embodiment, a shuttle valve for a lubrication system is provided. The shuttle valve includes a housing defining a cavity; a shuttle positioned within the cavity in a first position or a second position, the shuttle dividing the cavity into a first cavity section, a second cavity section, and a third cavity section; an inlet fluidly coupled to the first cavity section; an outlet fluidly coupled to the third cavity section; a flow passage extending between the first cavity section and the third cavity section such that lubrication in the lubrication system is directed through the inlet, through the first cavity section, through the flow passage, through the third cavity section, and through the outlet; and a first port fluidly coupled to the first cavity section when the shuttle is in the first position and to the second cavity section when the shuttle is in the second position.

BRIEF DESCRIPTION OF THE DRAWINGS

The present invention will hereinafter be described in conjunction with the following drawing figures in which like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein are directed to a lubrication system for delivering lubricant through nozzles of a gas turbine engine. The lubrication system includes a nozzle blockage detection system that provides a warning to an operator in the event of a nozzle blockage. Particularly, the nozzle blockage detection system includes a shuttle valve with a shuttle that translates between a first position and a second position. In the first position, a sensor is in fluid communication with the pressurized lubricant flowing through the shuttle valve. Upon a pressure increase downstream of the shuttle valve, such as during a nozzle blockage, the shuttle translates into the second position in which the sensor is no longer in fluid communication with the pressurized lubricant. In such a situation, the drop in pressure activates the sensor to initiate the operator warning. The nozzle blockage detection system may further include a high pressure sensor that activates a chip detector to initiate the operator warning.

Figure 1:
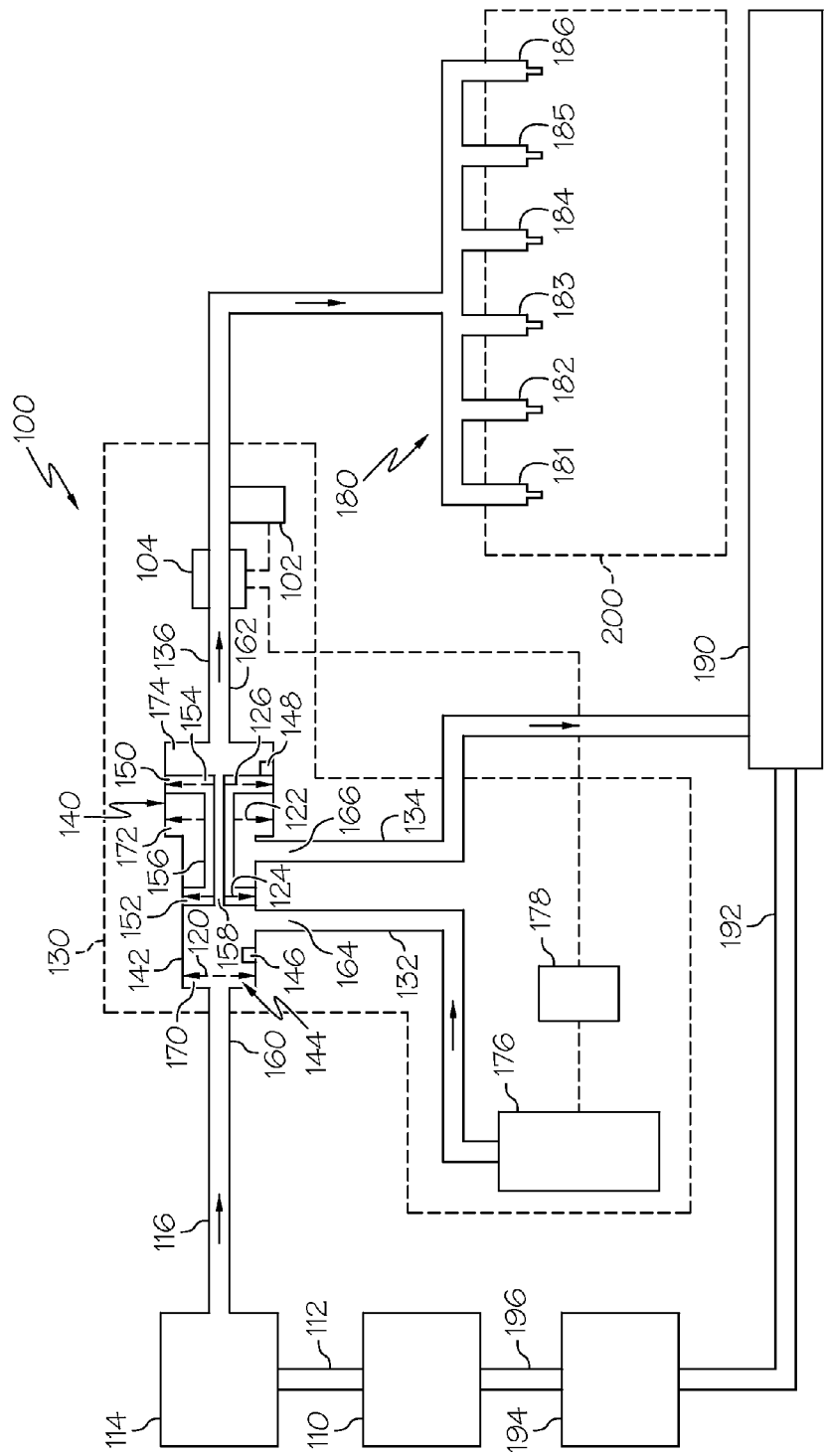
FIG. 1 is a schematic cross-sectional view of a lubrication system with a nozzle blockage detection system in a first position in accordance with an exemplary embodiment.

FIG. 1 is a schematic cross-sectional view of a lubrication system 100 for a gas turbine engine 200 in accordance with an exemplary embodiment. In general, the lubrication system 100 functions to provide a lubricant (e.g., oil) to the engine 200 for lubrication and/or cooling. The engine 200 may be any type of engine, including aircraft engines for propulsion, auxiliary power, and environment system operation. For example, the engine 200 includes machine elements such as bearings, journals, shafts, and joints, and the lubricant provided by the lubrication system 100 functions to decrease friction, prevent contamination, reduce wear, and/or dissipate heat. In one exemplary embodiment, the engine 200 may include a turbine section that receives lubricant from the lubrication system 100.

As schematically shown in FIG. 1, the lubrication system 100 includes a reservoir 110, a supply pump 114, a nozzle blockage detection system 130, a nozzle assembly 180, a sump 190, and a return pump 194. As described in greater detail below, the nozzle blockage detection system 130 includes one or more of a shuttle valve 140, a low pressure lubrication sensor 176, an indicator 178, a high pressure lubrication sensor 102, and a chip detector 104. Initially, the flow of lubricant through the lubrication system 100 will be described prior to a more detailed discussion about the nozzle blockage detection system 130.

The reservoir 110 holds a quantity of lubricant for use within the lubrication system 100. A typical lubricant is oil, but other lubricants may be used. The supply pump 114 removes the lubricant from the reservoir through a conduit 112 and provides the lubricant under pressure through a conduit 116 to the shuttle valve 140. In one exemplary embodiment, the supply pump 114 may provide the lubricant to the shuttle valve 140 at a pressure of about 90 psi.

As is discussed in greater detail below, the shuttle valve 140 includes a housing 142 with an inlet 160, an outlet 162, a first port 164, and a second port 166. The shuttle valve 140 further includes a cavity 144 and a shuttle 150 positioned to translate within the cavity 144.

The shuttle 150 is formed by a first piston 152 and a second piston 154 arranged on a piston rod 156. As is schematically shown in FIG. 1, the cavity 144 may have an upstream width 120 and a downstream width 122. The first piston 152 has a width 124 that is slightly less than the upstream width 120, and the second piston 154 has a width 126 that is slightly less than the downstream width 122. In this manner and as described below, the pistons 152 and 154 may create a generally fluid-tight seal with the housing 142, while maintaining the ability to translate within the cavity 144 under certain conditions. Accordingly, the pistons 152 and 154 function to divide the cavity 144 into a first cavity section 170 formed by an upstream end wall of the housing 142 and the first piston 152; a second cavity section 172 formed between the first piston 152 and the second piston 154; and a third cavity section 174 formed between the second piston 154 and the downstream end wall of the housing 142. As described below, the piston rod 156 defines an axial flow passage 158 that extends through the first and second pistons 152 and 154 and between the first and third cavity sections 170 and 174, thus excluding the second cavity section 172.

The housing 142 has at least two seats 146 and 148 within the cavity 144 that define the two primary positions for the shuttle 150 to translate within the cavity 144. In a first position, the second piston 154 contacts the second seat 148, and in a second position, the first piston 152 contacts the first seat 146. In the view of FIG. 1, the shuttle 150 is arranged in the first position against the second seat 148. Further details about the translation of the shuttle 150 are discussed below.

As noted above, the shuttle valve 140 receives lubricant in the cavity 144 through the inlet 160. The lubricant flows through the first cavity section 170, through the flow passage 158 defined in the shuttle 150, through the third cavity section 174, and out of the shuttle valve 140 via outlet 162. As such, the first cavity section 170, flow passage 158, and third cavity section 174 form part of the primary or main flow path of the lubricant through the lubrication system 100. As described in greater detail below, the second cavity section 172 forms part of a secondary flow path via conduit 134.

Additionally, since the downstream width 126 of the cavity 144 is greater than the upstream width 120, the pressure of the lubricant flowing out of the shuttle valve 140 is less than the pressure provided by the supply pump 114 such that the shuttle valve 140 at least partially acts as a check valve or orifice, in addition to the functions described below. An exemplary pressure at the outlet 162 may be, for example, about 30 psi.

Lubricant from the shuttle valve 140 flows through conduit 136 to the nozzle assembly 180. The nozzle assembly 180 generally includes one or more nozzles 181-186 that produce a stream or spray of lubricant to designated portions of the engine 200. Although six nozzles 181-186 are illustrated, any number of nozzles 181-186 may be provided.

The lubricant flows through the engine 200 and is collected in the sump 190. The return pump 194 removes the lubricant from the sump 190 through conduit 192 and subsequently returns the lubricant through conduit 196 to the reservoir 110 to repeat the circuit. Although not shown, the lubrication system 100 may include additional components, such as filters, heat exchangers, controllers, sensors, pumps, valves, vents, and the like.

At times, one or more of the nozzles 181-186 may become blocked by debris or coking. Coking typically occurs when the lubricant solidifies due to elevated temperatures in the engine 200, and the solids tend to lodge in the smaller passageways of the nozzles 181-186, thereby blocking or otherwise impeding the flow of lubricant to the engine 200. As introduced above, the nozzle blockage detection system 130 functions to detect such blockages and provide an alert or warning for an operator.

As noted above, the shuttle valve 140 is in the first position in FIG. 1. The first position generally corresponds to the position of the shuttle valve 140 during normal operating conditions in which there is no blockage or insignificant blockage within the nozzle assembly 180. In the first position, a conduit 132 fluidly couples the sensor 176 to the primary lubricant circuit or flow path. Particularly, the conduit 132 is fluidly coupled to the first cavity section 170 such that the lubricant in the first cavity section 170 maintains a threshold pressure in conduit 132 and thus the sensor 176.

As noted above, in one exemplary embodiment, the sensor 176 is a low pressure lubrication sensor. In other words, the sensor 176 has an inactive condition when the pressure in the conduit 132 is greater than a predetermined threshold and an active condition when the pressure in the conduit 132 reaches or drops below the predetermined threshold. The predetermined threshold may be, for example, 5 psi, 10 psi, 15 psi, or any suitable, relatively low pressure. Generally, when the conduit 132 is fluidly coupled to the first cavity section 170, the pressure at the sensor 176 is well above the predetermined threshold and the sensor 176 is inactive. The sensor 176 may be any type of low pressure sensor, including absolute, gauge, vacuum, differential, and seal, and may be further categorized as capacitive, electromagnetic, optical or the like.

In the event of a blockage in one of the nozzles 181-186, the pressure in the nozzle assembly 180, and thus the conduit 136, starts to rise. As a result, pressure in the third cavity section 174 of the shuttle valve 140 correspondingly increases and acts on the adjoining face of the second piston 154. Upon reaching a predetermined pressure increase, the pressure in the third cavity section 174 forces the shuttle 150 (e.g., the first piston 152, the second piston 154, and the piston rod 156) to translate in an upstream direction to a second position, as will be described with reference to FIG. 2. The shuttle 150 may be sized and configured according to a selected pressure increase for translation. For example, the pressure increase may be about 15 psi, e.g., a pressure of 45 psi relative to a normal outlet pressure of 30 psi.

Figure 2:
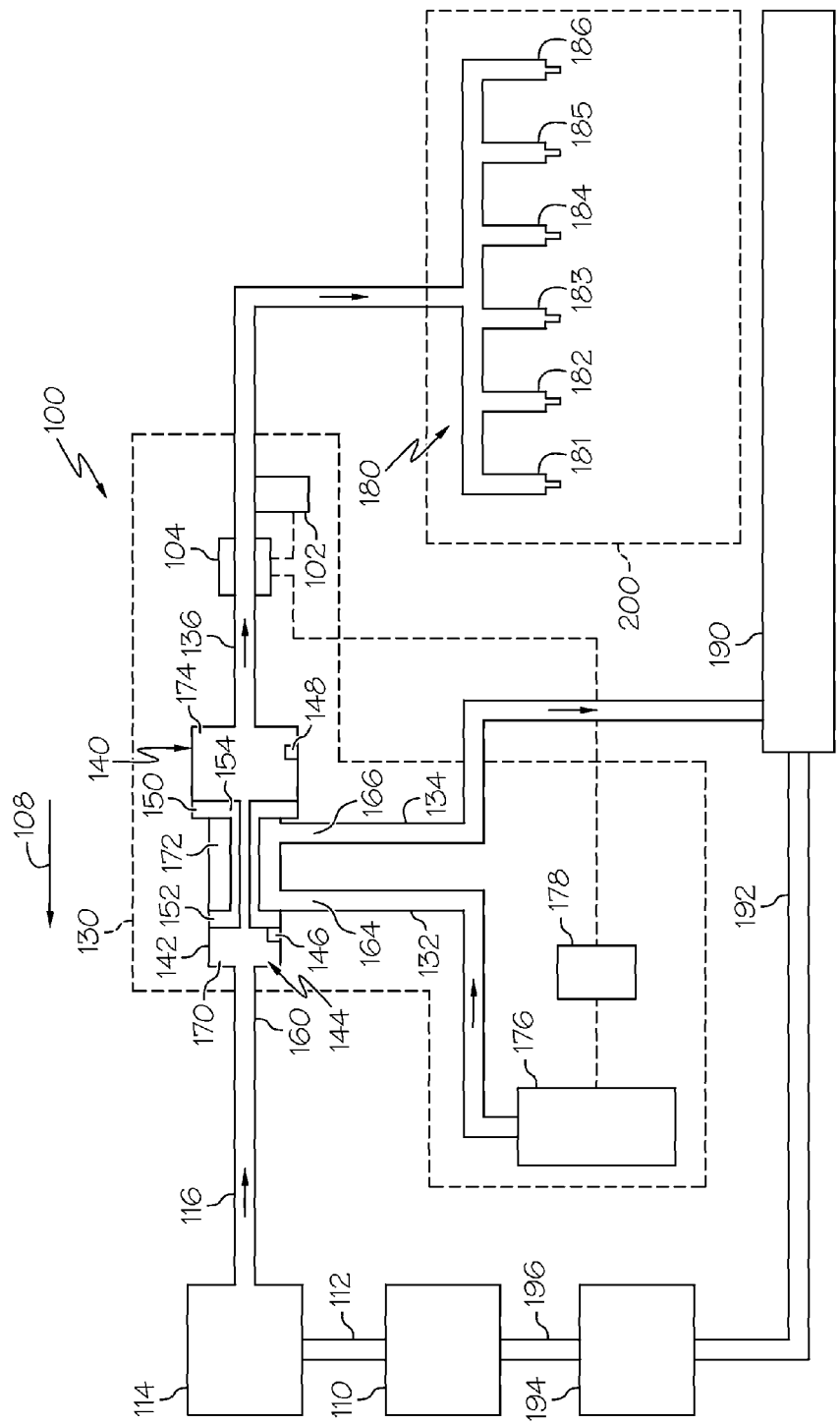
FIG. 2 is a schematic cross-sectional view of the lubrication system of FIG. 1 with the nozzle blockage detection system in a second position in accordance with an exemplary embodiment.

FIG. 2 is a schematic cross-sectional view of the lubrication system 100 of FIG. 1 with shuttle valve 140 in the second position. In comparison to FIG. 1, the shuttle 150 has moved in an upstream direction (e.g., direction 108) until the first piston 152 contacts against seat 146. In this position, the first piston 152 has fluidly de-coupled the port 164, and thus conduit 132, from the first cavity section 170 and the other portions of the primary flow circuit. Instead, the conduit 132 is fluidly coupled to a secondary flow circuit that includes the second cavity section 172, as well as conduit 134 and sump 190 via port 166. The second cavity section 172, conduit 132, and sump 190 are at a much lower pressure than the primary flow circuit and may be, for example, at an ambient pressure. As a result, the pressure decreases in the conduit 132 below the predetermined threshold and activates the sensor 176. Upon activation, the sensor 176 initiates an operator signal from the indicator 178. The indicator 178 may be an LED, warning, or other type of user interface displayed to the operator, for example, in a cockpit of an aircraft or vehicle. As such, the signal from the indicator 178 indicates to the operator that the sensor 176 has been activated, likely as a result of an increase in pressure and change in position of the shuttle valve 140, thereby indicating the detection of a nozzle blockage. In effect, the port 164, conduit 132, and sensor 176 provide a feedback path indicating the condition of the lubrication system 100 based on the position of the shuttle valve 140.

It should be noted that, even in the second position, the lubricant in the shuttle valve 140 still flows through the first cavity section 170, the flow passage 158, and the third cavity section 174 such that lubricant is still delivered to the nozzle assembly 180. In one exemplary embodiment, the hydraulic resistance of the shuttle 150 is the same in the first position as in the second position. As such, in addition to providing a warning about possible nozzle blockages, the nozzle blockage detection system 130 enables the lubrication system 100 to maintain operation during a blockage condition.

In addition to or in lieu of the shuttle valve 140 and low pressure sensor 176, the chip detector 104 and high pressure sensor 102 may function to initiate an operator warning via the indicator 178. As such, the chip detector 104 and high pressure sensor 102 may be a redundant warning mechanism. In other embodiments, the chip detector 104 and high pressure sensor 102 or the shuttle valve and low pressure sensor 176 may be omitted.

In the depicted embodiment, the chip detector 104 is positioned downstream of the shuttle valve 140, although in other embodiments, the chip detector 104 may be have other arrangements. The chip detector 104 is a lubrication sensor that determines the amount of debris (or "chips") flowing through the lubrication system 100. The amount of debris may be a health indicator for the turbine 200 or the lubrication system 100. As such, the chip detector 104 may be an existing lubrication sensor with functions otherwise independent of the nozzle blockage detection system 130. In one exemplary embodiment, the chip detector 104 includes electrical contacts on each side of the lubrication flow path (e.g., on either side of conduit 136), and as a piece of debris touches both contacts, an electrical circuit is completed and recorded. If the amount of debris reaches a predetermined amount, the chip detector 104 provides a debris warning to the operator or health management system.

In addition to being activated by debris, the chip detector 104 may also be activated by the high pressure sensor 102. The high pressure sensor 102 may be arranged upstream of the nozzle assembly 180 (e.g., at conduit 136) and designed to generate a signal for the chip detector 104 when the pressure upstream of the nozzle assembly 180 reaches a predetermined level that indicates a nozzle blockage may be occurring. The high pressure sensor 102 may be any type of pressure sensor, including absolute, gauge, vacuum, differential, and seal, and may be further categorized as capacitive, electromagnetic, optical or the like.

When the predetermined pressure is reached, the high pressure sensor 102 may provide a continuity signal to the chip detector 104 similar to that of debris such that the chip detector 104 is activated. In turn, the chip detector 104 provides a signal to the indicator 178 to function as an operator warning. In some exemplary embodiments, the warning from the indicator 178 may be relatively generic to indicate an issue in the lubrication system 100, and in other embodiments, the indicator 178 may distinguish between a chip or debris warning, a low pressure warning, and a nozzle blockage warning.

Figure 3:
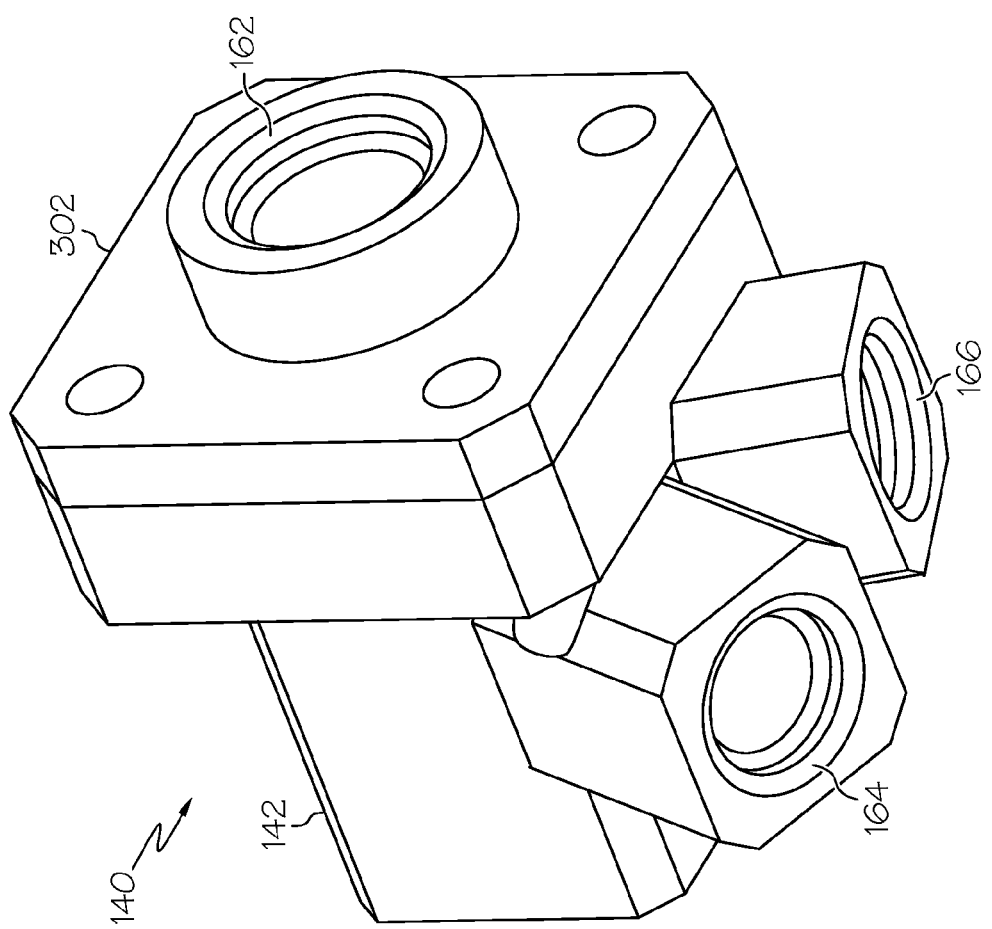
FIG. 3 is a first isometric view of a shuttle valve of the lubrication system of FIGS. 1 and 2 in accordance with an exemplary embodiment.
Figure 4:
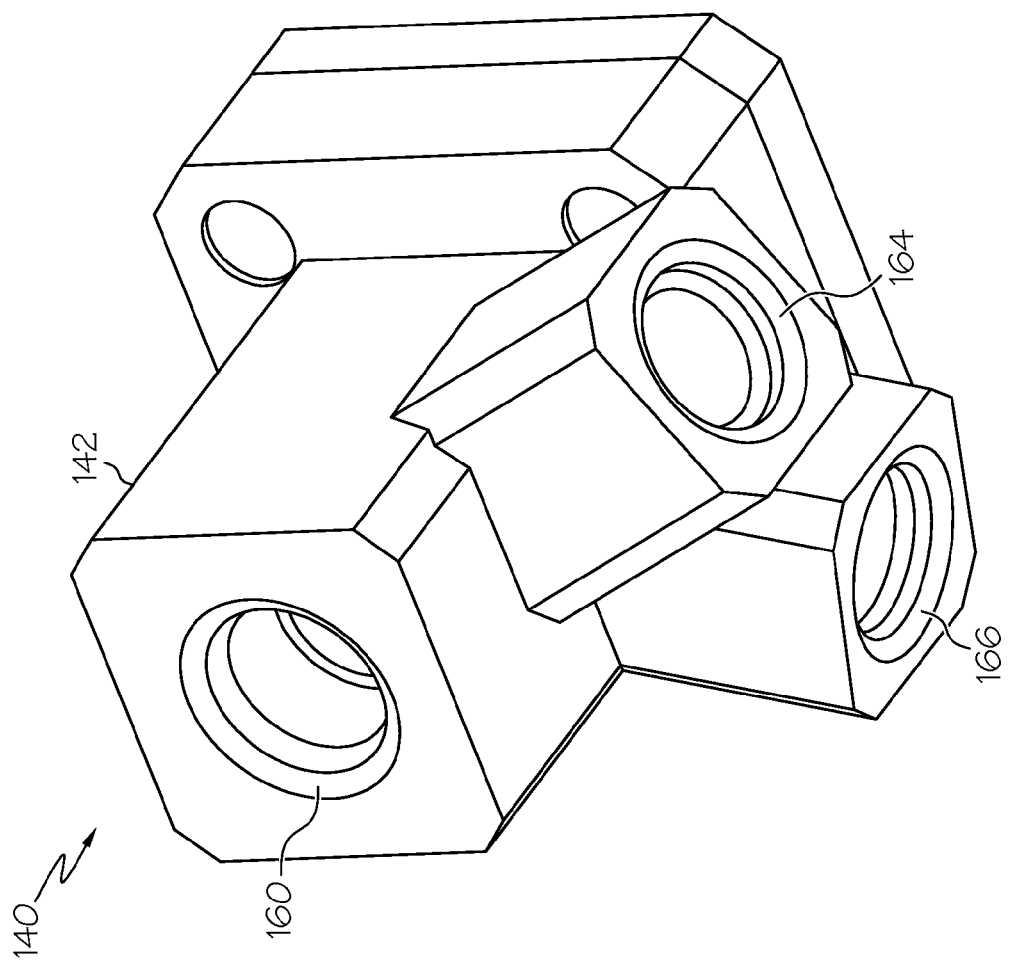
FIG. 4 is a second isometric view of the shuttle valve of the lubrication system of FIGS. 1 and 2 in accordance with an exemplary embodiment.
Figure 5:
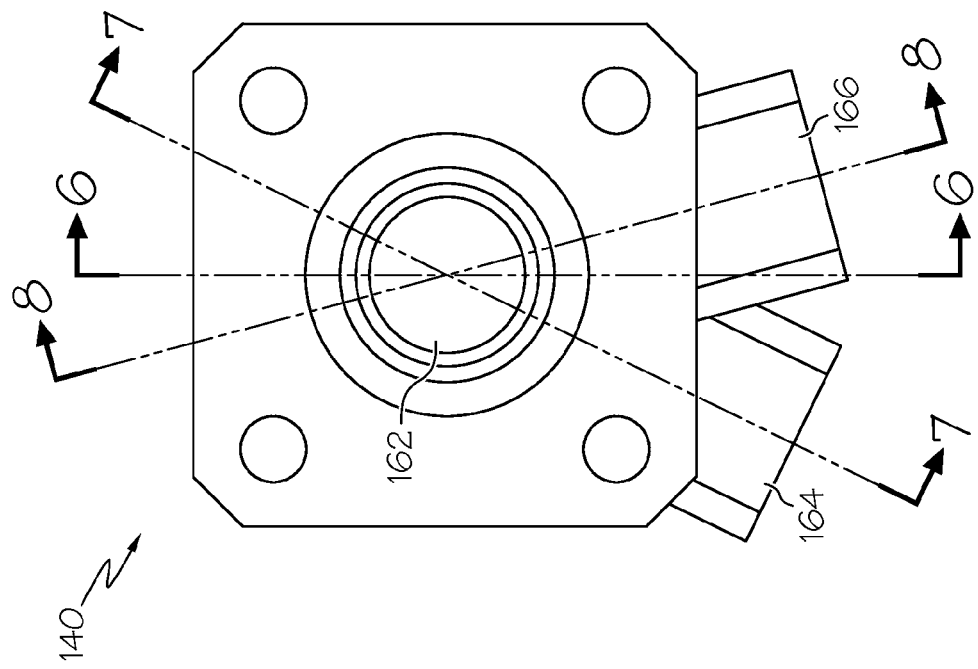
FIG. 5 is an end view of the shuttle valve of FIGS. 3 and 4 in accordance with an exemplary embodiment.

FIGS. 3-9 illustrate additional details about an exemplary embodiment of the shuttle valve 140. FIG. 3 is a first isometric view of the housing 142 and illustrates the outlet 162 that may be coupled to the conduit 136 for the nozzle assembly 180 (FIG. 1). The housing 142 may include a mounting flange 302 for mounting the shuttle valve 140 within the lubrication system 100. FIG. 3 also partially illustrates the port 166 that may be coupled to the conduit 134 for the sump 190 (FIG. 1) and the port 164 that may be coupled to the conduit 132 for the sensor 176 (FIG. 1). FIG. 4 is a second isometric view of the housing 142 and illustrates the inlet 160. FIG. 4 also partially illustrates the port 166 that may be coupled to the conduit 134 for the sump 190 (FIG. 1) and the port 164 that may be coupled to the conduit 132 for the sensor 176 (FIG. 1). FIG. 5 is an end view of the shuttle valve 140 and illustrates the outlet 162. As also shown in FIG. 5, the port 164 may be circumferentially offset relative to the port 166. In general, the ports 164 and 166 may be arranged in any suitable configuration to perform the functions discussed herein.

Figure 6:
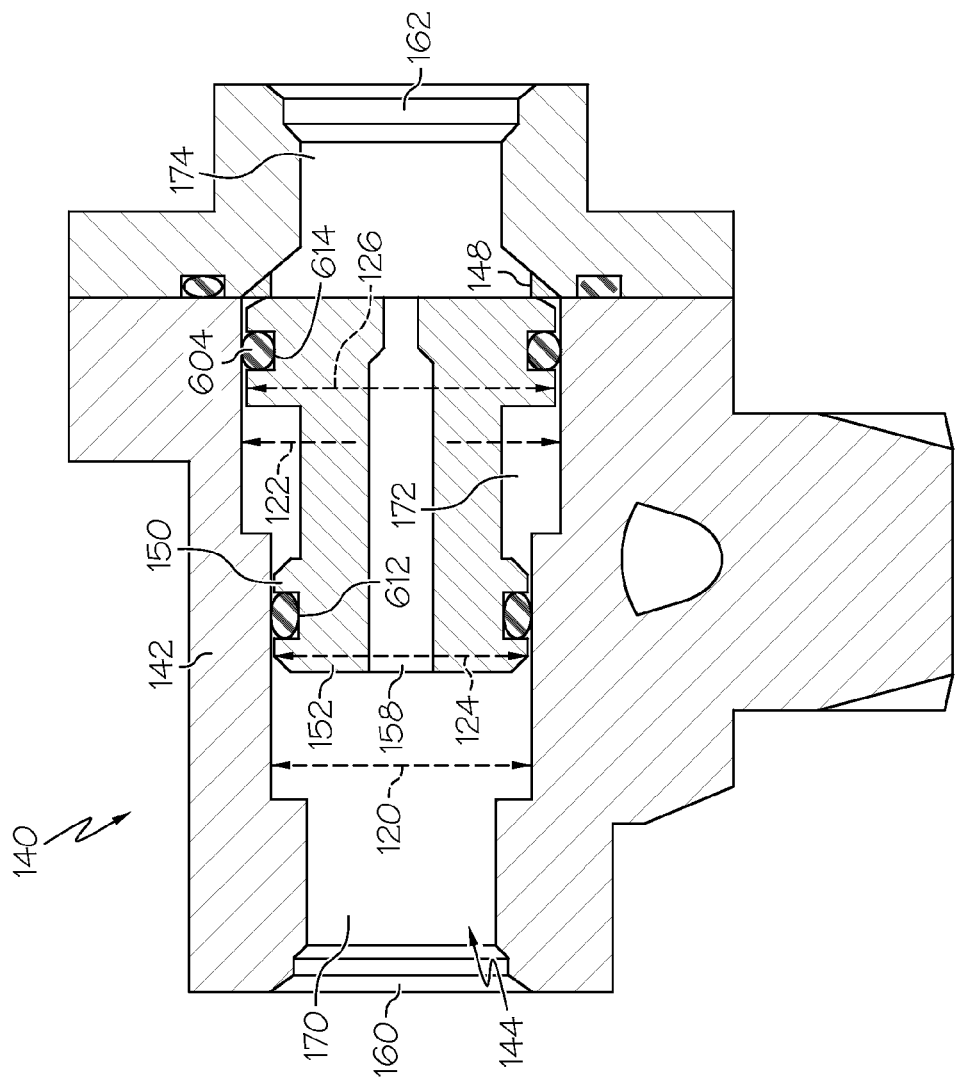
FIG. 6 is a cross-sectional view of the shuttle valve of FIG. 5 through line 6-6 in accordance with an exemplary embodiment.

FIG. 6 is a cross-sectional view of the shuttle valve 140 through line 6-6 of FIG. 5. As referenced above, the shuttle valve 140 includes the shuttle 150 arranged within the cavity 144. In the view of FIG. 6, the shuttle 150 is in the first position against seat 148. As described above, lubricant flow through the inlet 140, through the first cavity section 170, through the flow passage 158, through the third cavity section 174, and finally, out of the outlet 162.

As also noted above, the widths 124 and 126 of the pistons 152 and 154 generally correspond to the widths 120 and 122 of the cavity 144. A seal 602 is provided on an annular groove 612 in the first piston 152 to create a generally fluid-tight interface within the cavity 144 between the shuttle 150 and the housing 142. Similarly, a seal 604 is provided on an annular groove 614 in the second piston 154 to create a generally fluid-tight interface within the cavity 144 between the shuttle 150 and the housing 142. As shown, the grooves 612 and 614 may be axially outwardly facing on circumferential surface of the shuttle 150. In one exemplary embodiment, the seals 602 and 604 may be, for example, O-rings, although any suitable seal device may be used. The seals 602 and 604 enable the separation of cavity sections 170, 172, and 174. The seals 602 and 604 engage the housing 142 and function to restrict and resist movement according to a static friction force. As discussed above, during a blockage event, the pressures in the third cavity section 174 may overcome the static friction to translate the shuttle 150 into the second position. In the depicted embodiment, the seals 602 and 604 function to resist movement, although in other embodiments, springs or other resilient mechanisms may be used to bias the shuttle 150 in the first position.

Figure 7:
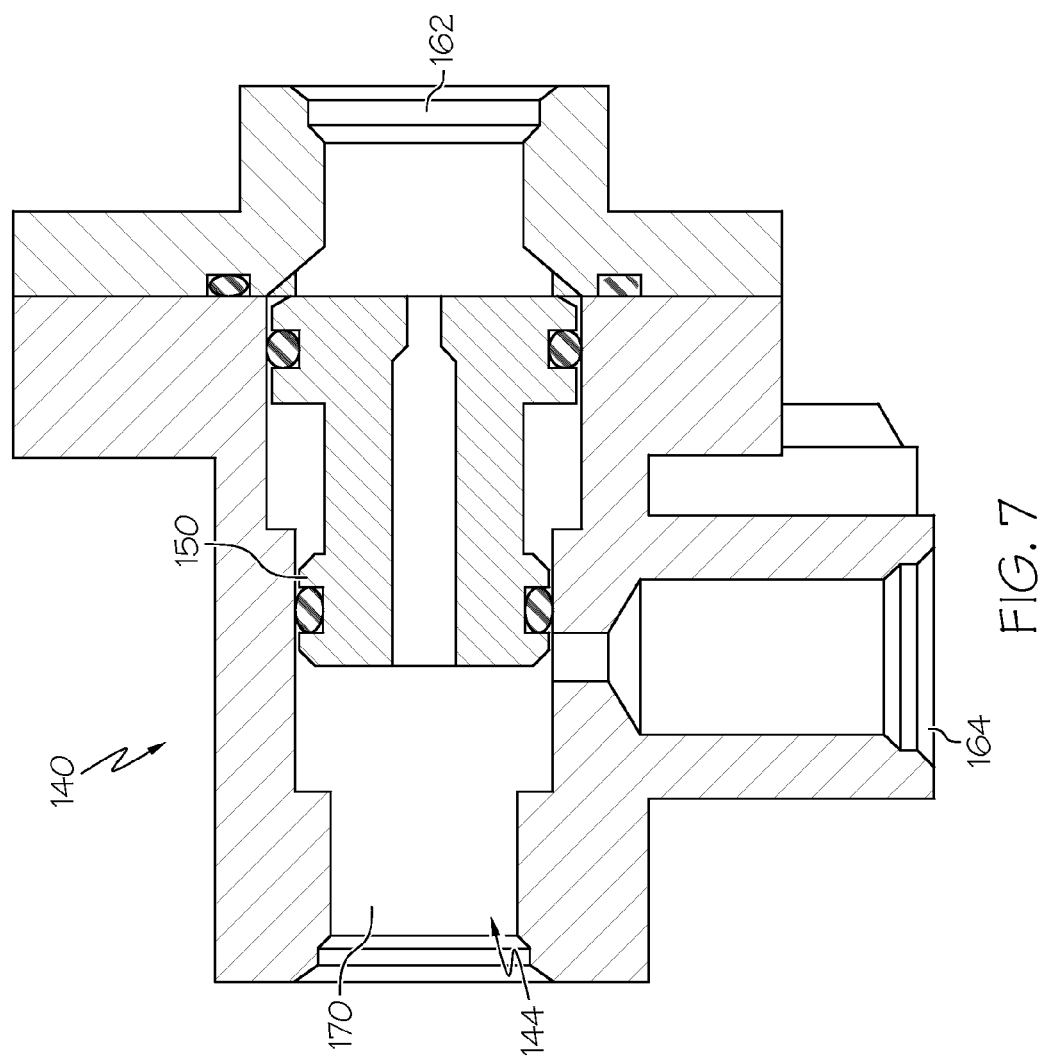
FIG. 7 is a cross-sectional view of the shuttle valve of FIG. 5 through line 7-7 in a first position in accordance with an exemplary embodiment.

FIG. 7 is a cross-sectional view of the shuttle valve 140 through line 7-7 of FIG. 5 and corresponds to a circumferentially clocked view of the shuttle valve 140 relative to FIG. 6. In particular, FIG. 7 illustrates the position of the shuttle 150 within the cavity 144 in the first position. As such, the port 164 to the conduit 132 for the sensor 176 (FIG. 1) is fluidly coupled to the first cavity section 170.

Figure 8:
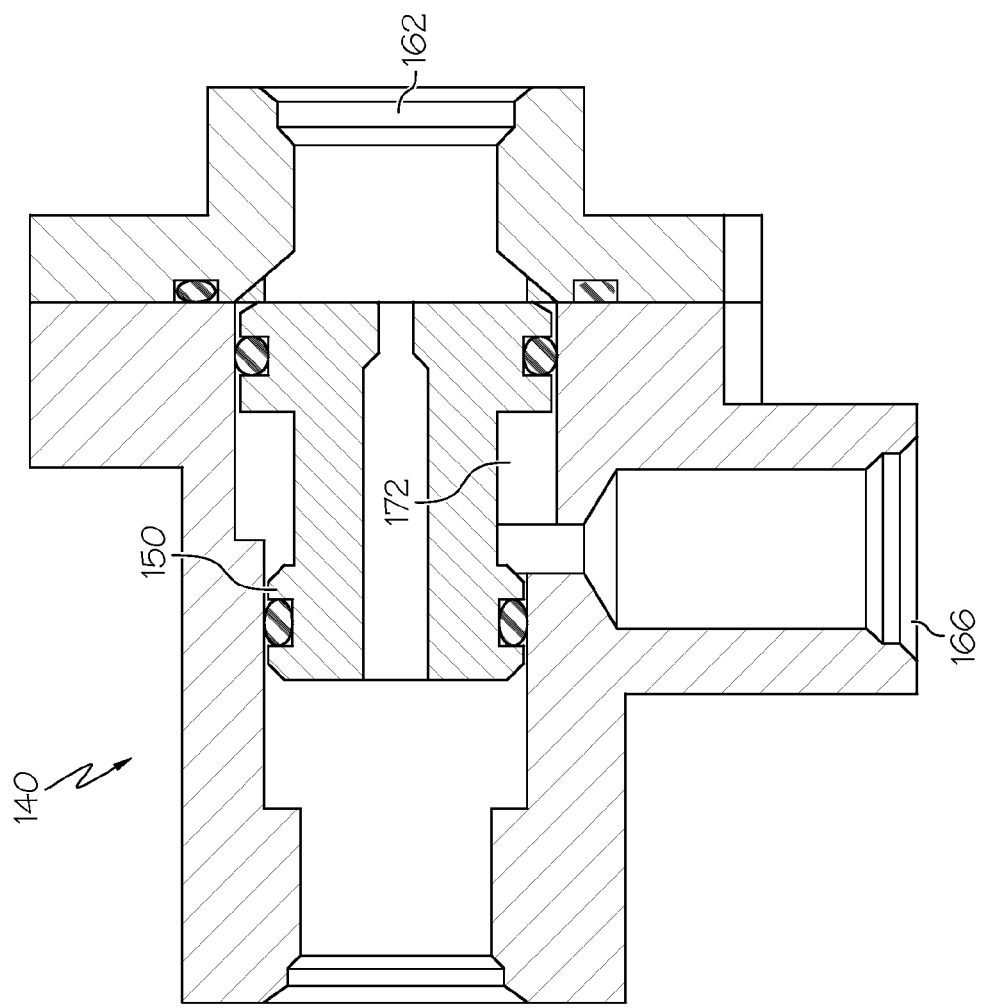
FIG. 8 is a cross-sectional view of the shuttle valve of FIG. 5 through line 8-8 in accordance with an exemplary embodiment.

FIG. 8 is a cross-sectional view of the shuttle valve 140 through line 8-8 of FIG. 5 and corresponds to a circumferentially clocked view of the shuttle valve relative to FIGS. 6 and 7. In particular, FIG. 8 illustrates the position of the shuttle 150 within the cavity 144 in the first position. As such, the port 166 to the conduit 134 for the sump 190 (FIG. 1) is fluidly coupled to the second cavity section 172. As noted above and as viewed from a comparison of FIGS. 7 and 8, port 164 is not fluidly coupled to port 166 when the shuttle 150 is in the first position.

Figure 9:
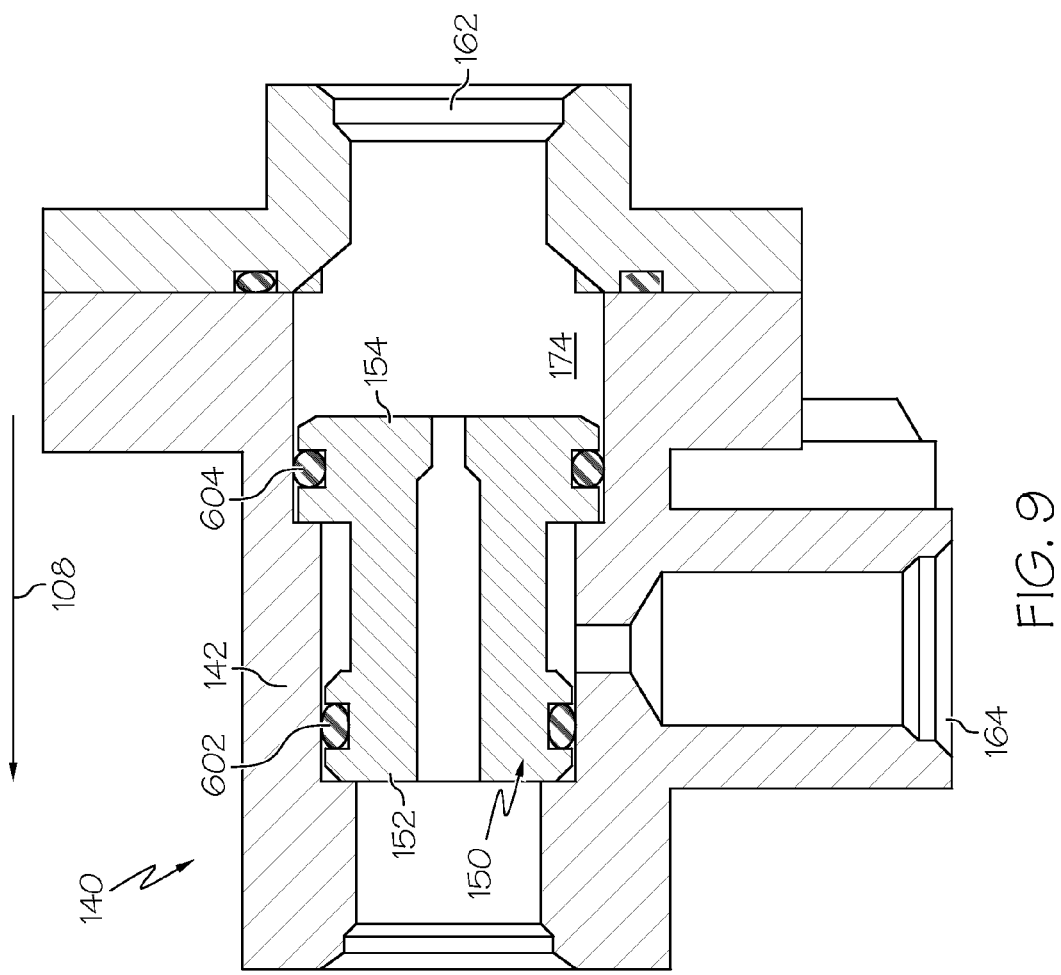
FIG. 9 is a cross-sectional view of the shuttle valve of FIG. 5 through line 7-7 in a second position in accordance with an exemplary embodiment.

FIG. 9 is another cross-sectional view of the shuttle valve 140 through line 7-7 of FIG. 5 and as such corresponds to the view of FIG. 7. However, in comparison to the view of FIG. 7, the shuttle valve 140 in FIG. 9 is in the second position. In other words, the shuttle valve 140 has shifted upstream, e.g., in the direction 108. In FIG. 9, the pressure in the third cavity section 174 has acted upon the second piston 154 to overcome the static friction at the interface between the seals 602 and 604 and the housing 142. The shuttle 150 particularly shifts against seat 146. In the second position, the first piston 152 has been repositioned such that the port 164 to conduit 132 (FIG. 2) and sensor 176 (FIG. 2) is fluidly coupled to the second cavity section 172. As a result, the port 164 is fluidly coupled to the port 166, conduit 134 (FIG. 2), and sump 190 (FIG. 2), thereby resulting in a drop in pressure and activation of the sensor 176 (FIG. 2) and indicator 178 (FIG. 2), as discussed above. Accordingly, the drop in pressure and resulting alarm indicates to the operator that the shuttle valve 140 has shifted into the second position, likely as a result of a nozzle blockage and corresponding pressure increase in the primary circuit or a general issue with the lubrication system 100.

Accordingly, a lubrication system with a nozzle blockage detection system is provided. The nozzle blockage detection system provides a mechanism for detecting nozzle blockages that generates a warning or indication for the operator. Additionally, the nozzle blockage detection system operates in a manner that does not interrupt the flow of lubricant to the nozzle assembly even during such a blockage situation. The nozzle blockage detection system provides these functions without extensive redesign of the lubrication system. In some embodiments, the lubrication sensors that make up the nozzle blockage detection systems may be existing sensors that perform other functions, such as detecting low pressure situations or debris. This also enables a reduction in the cost of the nozzle blockage detection system and the retrofit of existing lubrication systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A lubrication system for delivering a lubricant to a plurality of nozzles, comprising:
   a reservoir for the lubricant;
   a pump fluidly coupled to the reservoir and configured to remove a flow of the lubricant from the reservoir;
   a lubrication sensor positioned between the pump and the plurality of nozzles and configured to detect a blockage in the plurality of nozzles and to generate a blockage signal when the blockage is detected;
   an indicator coupled to the lubrication sensor and configured to generate a warning based on the blockage signal from the lubrication sensor; and
   a shuttle valve coupled to the pump for receiving the flow of the lubricant from the pump, the shuttle valve comprising a housing defining a cavity;
   a shuttle positioned within the cavity to divide the cavity into a first cavity section, a second cavity section, and a third cavity section, the shuttle defining a flow passage therethrough extending between the first cavity section to the third cavity section, the shuttle further having a first position and a second position and translating from the first position to the second position when a pressure in the third cavity section exceeds a predetermined threshold;
   an inlet fluidly coupled to the first cavity section; and an outlet fluidly coupled to the third cavity section such that a flow of fluid is directed through the inlet, through the first cavity section, through the flow passage in the shuttle, through the third cavity section, and through the outlet, the outlet configured to be fluidly coupled to the plurality of nozzles; and wherein the lubrication sensor is configured to determine when the shuttle is in the first position or the second position and to generate the blockage signal when the shuttle is in the second position.

2. The lubrication system of claim 1, wherein the shuttle valve further includes a first port fluidly coupled to the first cavity section when the shuttle is in the first position and to the second cavity section when the shuttle is in the second position.

3. The lubrication system of claim 2, wherein the first port is fluidly coupled to the lubrication sensor such that the lubrication sensor is fluidly coupled to the first cavity section when the shuttle is in the first position and to the second cavity section when the shuttle is in the second position.

4. The lubrication system of claim 3, wherein the first cavity section has a higher pressure than the second cavity section.

5. The lubrication system of claim 4, wherein the shuttle valve further includes a second port fluidly coupled to the second cavity section such that the first port is fluidly coupled to the second port when the shuttle is in the second position.

6. The lubrication system of claim 5, further comprising a sump fluidly coupled to the second port such that the lubrication sensor is fluidly coupled to the sump when the shuttle is in the second position.

7. The lubrication system of claim 1, wherein the shuttle valve further comprises a first seat to limit the shuttle in the second position and a second seat to limit the shuttle in the first position.

8. The lubrication system of claim 1, wherein the shuttle includes a seal that forms a friction engagement with the housing at a force corresponding to the predetermined threshold.

9. The lubrication system of claim 8, wherein the seal is an O-ring circumscribing the shuttle.

10. The lubrication system of claim 1, wherein the lubrication sensor is a low pressure sensor.

11. The lubrication system of claim 1, wherein the lubrication sensor is a chip detector further configured to detect debris in a flow of lubricant.

12. The lubrication system of claim 11, further comprising a high pressure sensor configured to activate the lubrication sensor to generate the blockage signal when the flow reaches a predetermined pressure.

13. The shuttle valve lubrication system of claim 2, wherein the shuttle includes a first piston, a second piston, and a rod supporting the first piston and the second piston, the first piston at least partially defining the first cavity section and the second cavity section, and the second piston at least partially defining the second cavity section and the third cavity section.

14. The lubrication system of claim 13, wherein the flow passage is defined through the rod.

15. The lubrication system of claim 2, wherein the shuttle valve further includes a second port fluidly coupled to the second cavity section such that the first port is fluidly coupled to the second port when the shuttle is in the second position.

16. The lubrication system of claim 2, wherein the shuttle includes an O-ring seal that forms a friction engagement with the housing at a force corresponding to a predetermined threshold.

17. A lubrication system for delivering a lubricant to a plurality of nozzles, comprising:
a reservoir for the lubricant;
a pump fluidly coupled to the reservoir and configured to remove a flow of the lubricant from the reservoir;
a shuttle valve coupled to the pump for receiving the flow of the lubricant from the pump, the shuttle valve comprising a housing defining a cavity;
a shuttle positioned within the cavity to divide the cavity into a first cavity section, a second cavity section, and a third cavity section, the shuttle defining a flow passage therethrough extending between the first cavity section to the third cavity section, the shuttle further having a first position and a second position and translating from the first position to the second position when a pressure in the third cavity section exceeds a predetermined threshold;
an inlet fluidly coupled to the first cavity section; an outlet fluidly coupled to the third cavity section such that a flow of fluid is directed through the inlet, through the first cavity section, through the flow passage in the shuttle, through the third cavity section, and through the outlet, the outlet configured to be fluidly coupled to the plurality of nozzles;
a first port fluidly coupled to the first cavity section when the shuttle is in the first position and to the second cavity section when the shuttle is in the second position; and
a second port fluidly coupled to the second cavity section when the shuttle is in the first position and the second position;
a sump fluidly coupled to the second port; a low pressure sensor fluidly coupled to the first port such that the low pressure sensor is fluidly coupled to the first cavity section when the shuttle is in the first position and is fluidly coupled to the second cavity section and the sump when the shuttle is in the second position, the second cavity section having a lower pressure than the first cavity section to activate the low pressure sensor when the shuttle is in the second position; and an indicator coupled to the low pressure sensor and configured to provide a signal to an operator when the low pressure sensor is activated.

* * * * *